United States Patent
Suryanarayana et al.

(10) Patent No.: US 11,210,758 B2
(45) Date of Patent: Dec. 28, 2021

(54) SYSTEM AND METHOD FOR UEFI ADVANCED GRAPHICS UTILIZING A GRAPHICS PROCESSING UNIT

(71) Applicant: DELL PRODUCTS, LP, Round Rock, TX (US)

(72) Inventors: Shekar Babu Suryanarayana, Bangalore (IN); Anand Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/790,186

(22) Filed: Feb. 13, 2020

(65) Prior Publication Data

US 2021/0256652 A1    Aug. 19, 2021

(51) Int. Cl.

| | |
|---|---|
| *G06F 15/16* | (2006.01) |
| *G06T 1/20* | (2006.01) |
| *G06F 13/20* | (2006.01) |
| *G06F 9/4401* | (2018.01) |
| *G06F 13/42* | (2006.01) |
| *G09G 5/00* | (2006.01) |
| *G09G 5/37* | (2006.01) |

(52) U.S. Cl.
CPC .............. *G06T 1/20* (2013.01); *G06F 9/4406* (2013.01); *G06F 13/20* (2013.01); *G06F 13/4221* (2013.01); *G06F 13/4282* (2013.01); *G09G 5/003* (2013.01); *G09G 5/37* (2013.01); *G06F 2213/0024* (2013.01); *G06F 2213/0042* (2013.01); *G09G 2340/0464* (2013.01)

(58) Field of Classification Search
CPC ...... G06F 9/4406; G06F 9/4408; G06F 9/441; G06F 21/572; G06F 21/575; G09G 2330/026
See application file for complete search history.

(56) References Cited

U.S. PATENT DOCUMENTS

| | | | |
|---|---|---|---|
| 9,640,139 B2 | 5/2017 | Moyes | |
| 9,733,721 B2 | 8/2017 | Vidyadhara et al. | |
| 2012/0254602 A1* | 10/2012 | Bhansali | G06F 9/4406 713/2 |
| 2012/0255021 A1* | 10/2012 | Sallam | G06F 21/566 726/25 |

* cited by examiner

*Primary Examiner* — Hau H Nguyen
(74) *Attorney, Agent, or Firm* — Larson Newman, LLP

(57) ABSTRACT

A central processing unit executes a graphics accelerated operation during a pre-boot basic input/output system (BIOS). The central processing unit initializes multiple protocol scheduler circuitry during an early phase of the pre-boot BIOS. The multiple protocol scheduler circuitry initializes host memory pages, and creates one or more bit block transfer tasklets during the pre-boot BIOS. A graphics processing core executes one of the bit block transfer tasklets, and renders a graphical user interface element for display during the pre-boot BIOS.

19 Claims, 4 Drawing Sheets

SYSTEM AND METHOD FOR UEFI ADVANCED GRAPHICS UTILIZING A GRAPHICS PROCESSING UNIT

FIELD OF THE DISCLOSURE

The present disclosure generally relates to information handling systems, and more particularly relates to unified extensible firmware interface advanced graphics utilizing a graphics processing unit.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

A central processing unit may execute a graphics accelerated operation during a pre-boot basic input/output system (BIOS). The central processing unit may initialize multiple protocol scheduler circuitry during an early phase of the pre-boot BIOS. The multiple protocol scheduler circuitry may initialize host memory pages, and create one or more bit block transfer tasklets during the pre-boot BIOS. A graphics processing core may execute one of the bit block transfer tasklets, and render a graphical user interface element for display during the pre-boot BIOS.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
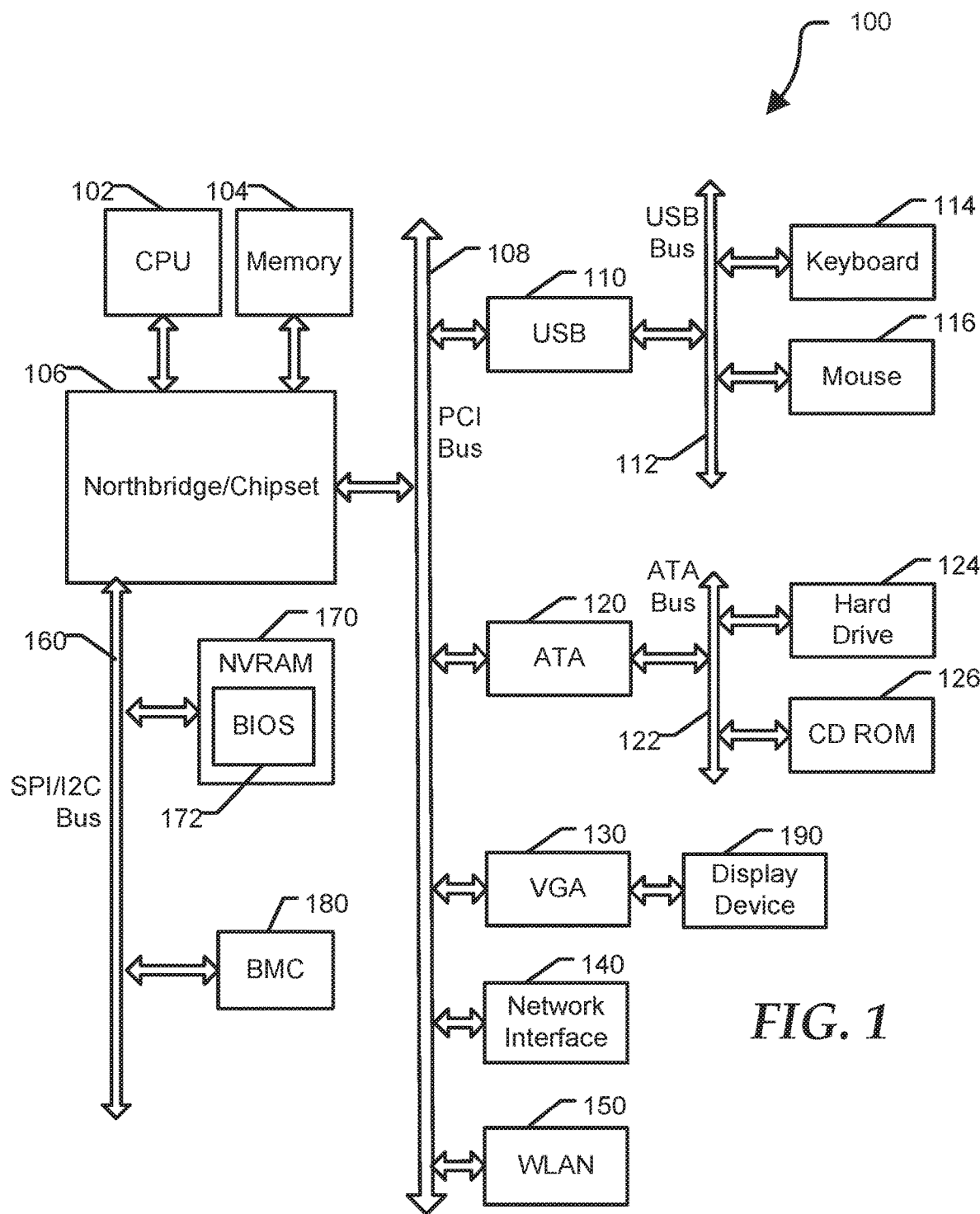
FIG. 1 is a block diagram of a general information handling system according to at least one embodiment of the disclosure.

FIG. 1 illustrates a general information handling system 100 including a central processing unit (CPU) 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
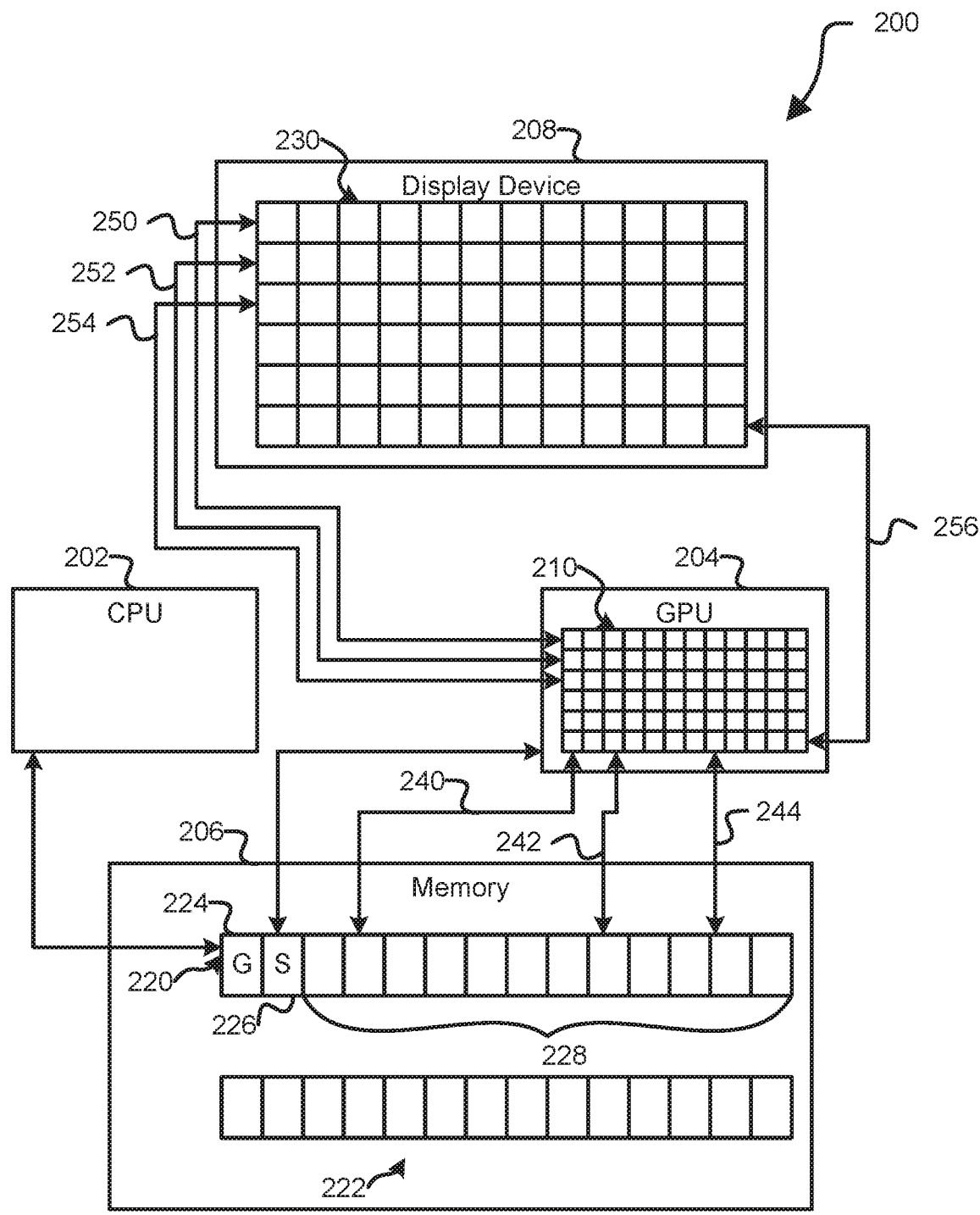
FIG. 2 is a block diagram of a portion of an information handling system to assign tasklets to cores of a graphics processing unit during execution of a basic input/output system according to at least one embodiment of the disclosure.

FIG. 2 is a block diagram of a portion of an information handling system 200 to assign tasklets to cores of a graphics processing unit for advanced graphics rendering during execution of a unified extensible firmware interface (UEFI) BIOS according to at least one embodiment of the disclosure. Information handling system 200 includes a central processing unit (CPU) 202, a graphics processing unit (GPU) 204, a memory 206, and a display device 208. GPU 204 includes any suitable number of cores 210. For example, the number of cores 210 within GPU 204 may include 50, 75, 100, 150, or the like. Memory 206 includes an instruction stack 220 and GPU host memory pages 222. Display device 230 may have any particular resolution including, but not limited to, 4 K resolution. In an example, display device 208 may be divided into a multiple portions 230. In an embodiment, each portion 230 may be associated with a different pixel area of display device 208.

Information handling system 200 may be employed, in whole or in part, by information handling system 100 illustrated in FIG. 1, or any other system, device, component, or the like operable to employ portions, or all of, the information handling system. In an example, information handling system 200 may include more components than shown in FIG. 2 without varying from the scope of this disclosure. For example, GPU 204 may include a different number of cores 210 and display device 208 may be divided into a different number of portions 230.

During pre-boot operations, such as basic input/output system (BIOS)/UEFI operations, prior information handling systems utilize a GPU only to render a video buffer from graphics output protocol (GOP). However, previous information handling systems would not utilize a GPU to render advanced graphics to control user interface (UI) elements during pre-boot operations. In these information handling systems, the CPU would perform all graphics rendering during pre-boot even while a GPU is sitting idle. Instead, previous information handling systems utilize GPUs to display a video buffer on a screen of a display device while the host CPU is used to execute the majority of graphics processing during pre-boot operations. However, the UEFI operation in an information handling system is a single threaded, such that running advanced graphics reduces the performance of BIOS applications during the pre-boot operation. Thus, implementing a bit block transfer (BitBLT) and graphics device interface (GDI) stack processing within GPU 204 improves information handling system 200 during pre-boot operations, as will be described herein.

Initialization of information handling system 200, herein referred to as a UEFI boot or pre-boot flow, can be divided into a sequence of phases including a pre-EFI initialization (PEI) phase, followed by a driver execution environment (DXE) phase, a boot device selection (BDS) phase, and a run time (RT) phase. The UEFI boot sequence can include additional phases. UEFI images can include UEFI drivers, applications, and bootloaders, and are a class of files defined by UEFI that contain executable code. A UEFI bootloader, and a boot manager in particular, is a firmware policy engine that is in charge of loading the operating system loader and all necessary drivers. UEFI applications can be loaded by the boot manager or by other UEFI applications to accomplish platform specific tasks within the boot services environment.

A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol is identified by a global unique identifier (GUID), which is a 128-bit value, and an interface pointer.

During pre-boot operations of information handling system 200, one or more tasks may be loaded into instruction stack 220. For example, early in a PEI phase a graphics accelerated method (GAM) operation or task 224 may be loaded into CPU 202 from instruction stack 220. Execution of GAM operation 224 may cause CPU 202 to perform one or more operations to initialize GPU 204 to provide advanced graphics UI elements during pre-boot operations. In an example, the GAM operation 224 may initialize a GPU multi-protocol scheduler 226 and generate or create one or more graphics rendering tasklets 228. In an embodiment, GPU 204 may execute GPU multi-protocol scheduler 226 and tasklets 228 during the pre-boot operations of information handling system 200.

In an example, GPU 204 may execute GPU multi-protocol scheduler 226 during the PEI phase to perform one or more operations for advanced graphics rendering. For example, GPU multi-protocol scheduler 226 may initialize GPU host memory pages 222. In an embodiment, GPU host memory pages 222 may store any suitable data associated with graphics rendering by GPU 204 including, but not limited to, GPU related tasks, priority lists, and timer-events. In an example, the GPU related tasks, priority lists, and timer-events stored in GPU host memory pages 222 may be created and processed by GPU multi-protocol scheduler 226.

During pre-boot operations, CPU 202 may execute GAM operation 224, which may cause the CPU to identify graphics resolution of display device 208 and initialize GPU 204 for advanced graphics rendering. GAM operation 224 may also create one or more tasklets 228 and store the tasklets within instruction stack 220. In an example, tasklets 228 may be independent tasks or jobs, which may be run on GPU 204 without CPU dependency, and the tasklets may return a work status to GAM operation 224 running on CPU 202. Additionally, GAM operation 224 may install a GOP on GPU 204. The GOP may be utilized to synchronize execution of tasklets 228 between GPU 204 and GPU multi-protocol scheduler 226.

In an example, the combination of GAM operation 224 and GPU multi-protocol scheduler 226 may offload graphics rendering from CPU 202 to GPU 204 during pre-boot operations. The offloading of the graphics rendering may both improve graphics quality and decrease processing burdens of CPU 202 during the pre-boot operations.

In an embodiment, GAM operation 224 may generate or create any suitable number of tasklets 228 for execution by cores 210 of GPU 204. In an example, the number of tasklets 228 may be based on any suitable criteria including, but not limited to, the number of cores 210 within GPU 204 and the resolution of display device 208. For example, if GPU 204 includes 100 cores 210 and display device 208 has 4 K resolution, GAM operation 224 may generate or create 100 tasklets 228 and each tasklet may be assigned to a different core of the GPU, as illustrated by arrows 240, 242, and 244 within FIG. 2. One of ordinary skill would recognize that while arrows 240, 242, and 244 only illustrate assignment of three of tasklets 228 to three of cores 210, each other tasklet may be similarly assigned to a different core. In an example, each core 210 may be associated with a different pixel portion 230 as illustrated by arrows 250, 252, 254, and 256 within FIG. 2. One of ordinary skill would recognize that while arrows 250, 252, 254, and 256 only illustrate associated of four of cores 210 to four portions 230, each core may be similarly associated with a different portion.

In an example, tasklets 228 may be bit block transfer (BitBLT) operations, which when executed by one of cores 210 may cause a block of bits to be moved from one location in memory 206 to another. In certain examples, these bits may represent display pixels, such that moving a block of bits in memory 206 may cause a part of an image to be moved from one place to another on display device 208. In an embodiment, a BitBLT operation may be a hardware feature that moves a rectangular block of bits from main memory into display memory. In this embodiment, the BitBLT operation may speed up the display of moving objects, such as animation, scrolling text, icon rendering, or the like, on display screen 208. Thus, BitBLT operations during pre-boot or BIOS may provide a fast rendering speed with high BIOS performance and response time. For example, during pre-boot, text scrolls may be executed faster when the data is copied as a contiguous block, via a BitBLT operation, to a next of part of the display window as compared to processing every character of the text on every line.

In pre-boot UEFI BIOS operations, the BitBLT operations of tasklets 228 may cause cores 210 to quickly display graphical user interface (GUI) screen icons, widgets, fonts, or the like. In previous information handling systems, the operation of displaying the GUI screen icons was executed so extensively in a CPU that a lot of processing speed was required during UEFI operations. However, in information handling system 200, the BitBLT operations of tasklets 228 implement special instructions to speed up the graphics rendering by running parallel tasklets on separate cores 210 during pre-boot operations. In certain examples, an enhanced type of BitBLT operation may be used for resizing video images. In these examples, the BitBLT operation may expand or contract the number of bits within the block of bits while moving the bits from main memory to the display memory.

In an example, each core 210 may be initialized by a new GDI stack to run an independent tasklet 228, and each tasklet may be defined as an advanced graphics rendering task. In an embodiment, the advanced graphics rendering task of tasklet 228 may be mapped, via the assigned core 210, to a portion 230 of display device 208. Thus, tasklets 228 may provide dynamic control of user interface objects or elements on display device 208 during UEFI BIOS. These tasklets 228 may be intelligently executed and managed to provide a richer graphical user interface in BIOS with faster response time as compared to graphics rendering performed by a CPU in BIOS.

Figure 3:
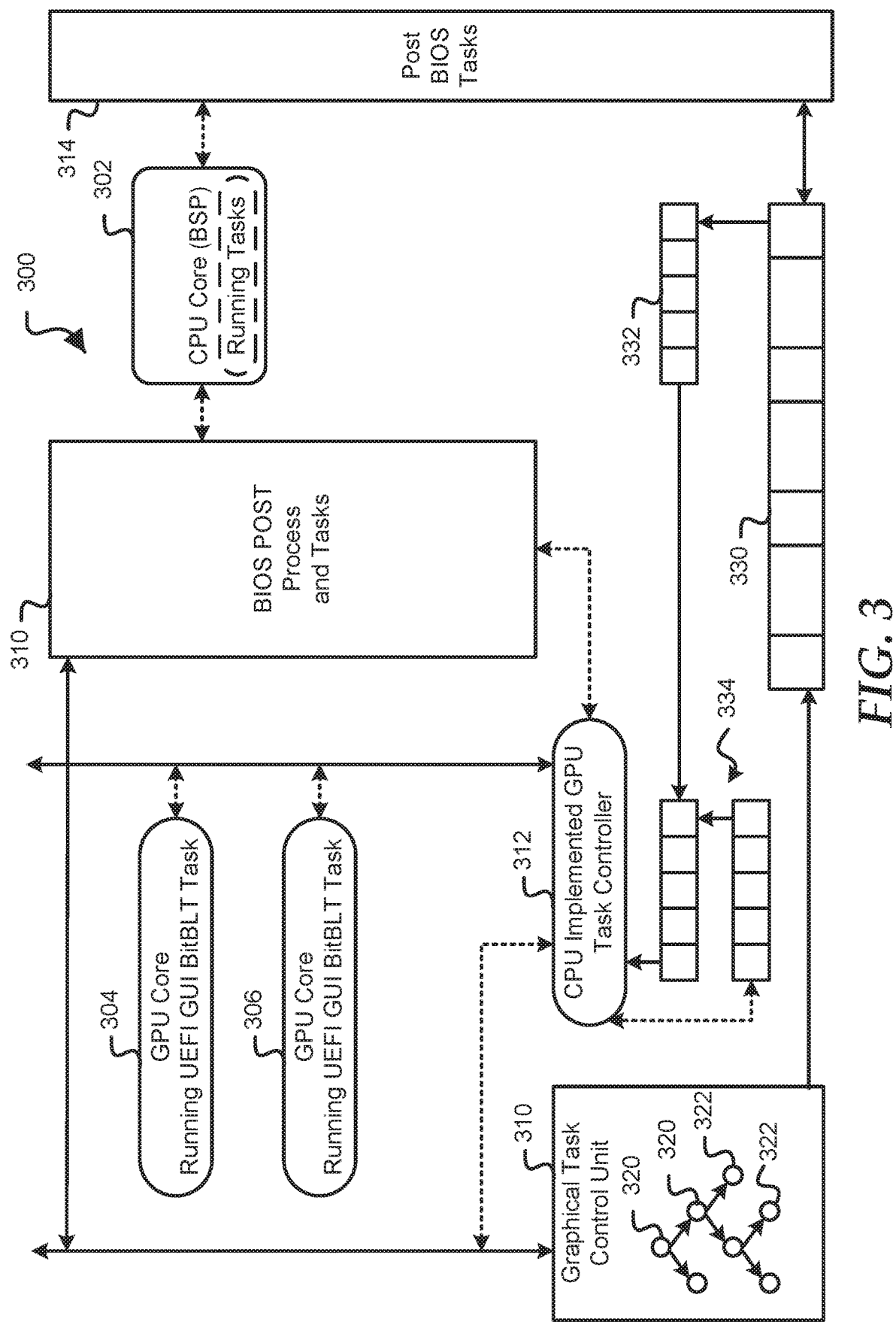
FIG. 3 is a diagram illustrating a graphics processing unit accelerated method for bit block transfers during the basic input/output system according to at least one embodiment of the disclosure.

FIG. 3 is a diagram illustrating a graphics processing unit accelerated method 300 for bit block transfers during the BIOS of an information handling system according to at least one embodiment of the disclosure. Method 300 includes tasks running on a CPU 302, a first task running on a first GPU core 304, a second task running on a second GPU core 306, BIOS POST processes and tasks 308, a graphical task control unit 310, a CPU implemented GPU task controller 312, and post BIOS tasks 314. In an example, tasks running on CPU 302, tasks running on first GPU core 304, tasks running on second GPU core 306, BIOS POST processes and tasks 308, post BIOS tasks 314, graphical task control unit 310, and CPU implemented GPU task controller 312 may be employed, in whole or in part, by information handling system 100 illustrated in FIG. 1, information handling system 200 illustrated in FIG. 2, or any other system, device, component, or the like operable to employ portions, or all of, the information handling system.

Method 300 may include more tasks than shown in FIG. 3 without varying from the scope of this disclosure. For example, method 300 may include a different number of tasks running on GPU cores. However, for clarity and brevity FIG. 3 will be described only with respect to first task 304 running on a first GPU core and second task 306 running on a second GPU core.

During pre-boot or UEFI BIOS, a CPU core may execute one or more tasks 302. For example, the CPU may execute BIOS POST processes and tasks 308. In an example, BIOS POST processes and tasks 308 may include a GAM operation, described above with respect to FIG. 2. The GAM operation of BIOS POST processes and task 308 may learn pre-boot POST GUI task execution and create graphical task control unit 310.

In an example, graphical task control unit 310 may perform one or more operations to execute graphical processing tasks via GDI stack task 320 and BitBLT tasks 322. In certain examples, GDI stack tasks 320 and BitBLT tasks 322 may form a tree structure, as shown in FIG. 3, and these tasks may be utilized to perform advance graphics rendering during pre-boot operations. In response to BitBLT tasks 322 being generated, graphical task control unit 310 may provided the BitBLT tasks to a task ready queue 330.

BitBLT tasks 322 may follow through task ready queue 330, and either be buffered in queue 332 or provided as post BIOS tasks 314. In an example, during pre-boot operations, BitBLT tasks 322 may be buffered in queue 332 and then provided to GPU task queue 334. GPU task controller 312 may retrieve BitBLT tasks 322 from GPU task queue 334 and then assign a different BitBLT task to a different GPU core. For example, a first BitBLT task may be assigned to first GPU core 304 and a second BitBLT task may be assigned to second GPU core 306.

In an example, GPU core 304 may execute the first BitBLT task independently from GPU core 306 executing the second BitBLT task. In response to GPU core 304 or GPU core 306 completely its assigned BitBLT task, the GPU core may notify GPU task controller 312, which in turn may notify graphical task control unit 310. Graphical task control unit 310 may then generate another BitBLT task 322 for execution by a GPU core. During pre-boot operations, these operations may continue while CPU 302 is free to execute other pre-boot operations. Thus, the execution and control of BitBLT tasks 322 within GDI stacks 320 may increase BIOS performance and produce faster graphics rendering during pre-boot operations as compared to previous graphics rendering executed by a CPU.

Figure 4:
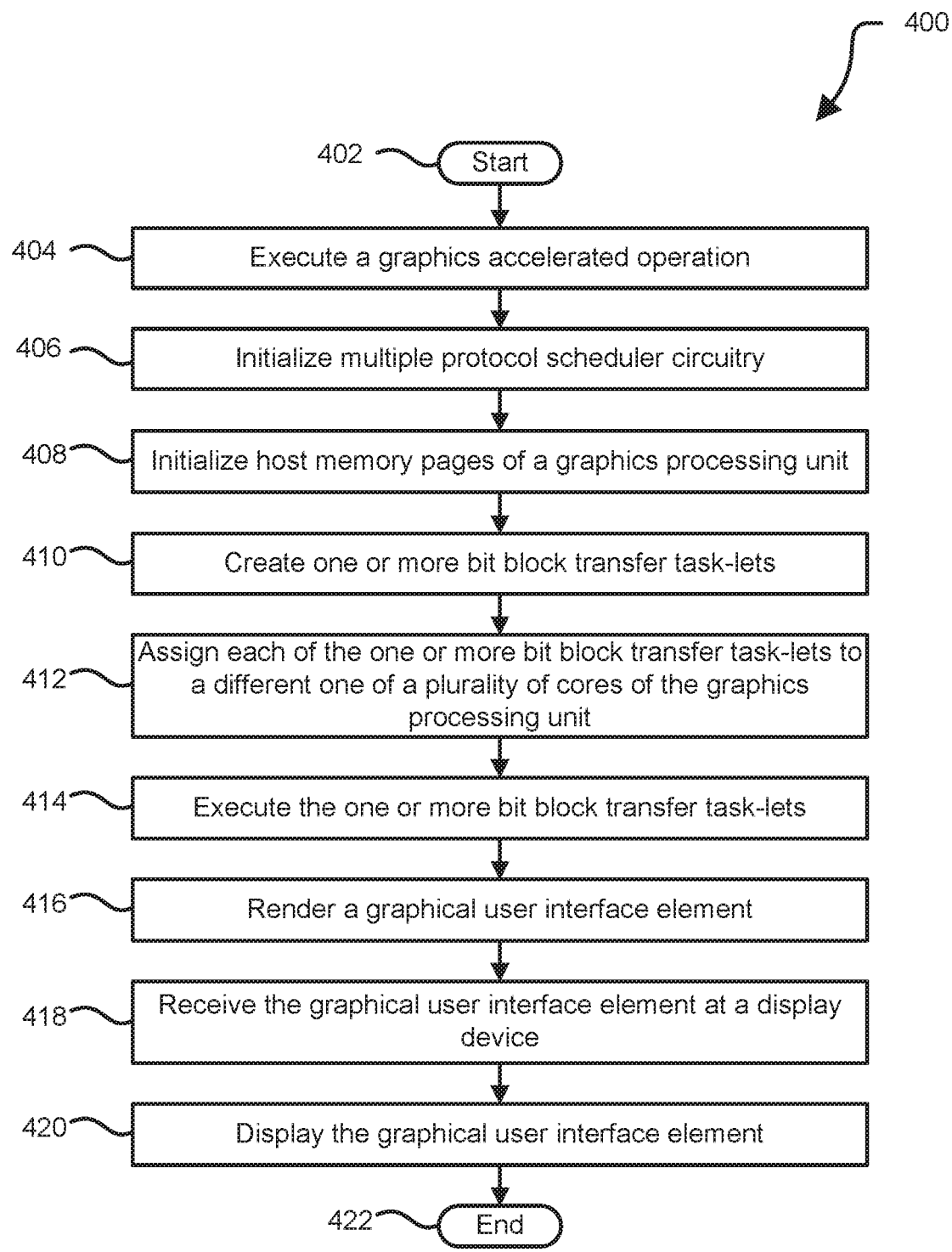
FIG. 4 is a flow diagram illustrating a method for utilizing a graphics processing unit to provide unified extensible firmware interface (UEFI) advanced graphics according to at least one embodiment of the disclosure.

FIG. 4 is a flow diagram illustrating a method 400 for utilizing a graphics processing unit to provide UEFI advanced graphics according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, a graphics accelerated method (GAM) operation is executed. In an example, the GAM operation may be utilized to perform one or more operations for UEFI advanced graphics. In an embodiment, the GAM operation may be execute during a PEI phase of a pre-boot UEFI BIOS operation.

At block 406, a multi-protocol scheduler circuitry is initialized. In an example, the multi-protocol scheduler circuitry may be initialized during the PEI phase of the pre-boot operations. At block 408, host memory pages of a graphics processing unit are initialized. In an example, the multi-protocol scheduler circuitry may initialize the host memory pages.

At block 410, one or more bit block transfer tasklets are created. In an embodiment, a BitBLT operation may be a hardware feature that moves a rectangular block of bits from main memory into display memory. In this embodiment, the BitBLT operation may speed up the display of moving objects, such as animation, scrolling text, icon rendering, or the like, on a display screen. Thus, BitBLT operations during pre-boot or BIOS may provide a fast rendering speed with high BIOS performance and response time. For example, during pre-boot, text scrolls may be executed faster when the data is copied as a contiguous block, via a BitBLT operation, to a next of part of the display window as compared to processing every character of the text on every line.

At block 412, each of the bit block transfer tasklets are assigned to a different one of a plurality of cores of the graphics processing unit. At block 414, the bit block transfer tasklets are executed. In an example, each of the bit block transfer tasklets may be executed independently on the different cores of the graphics processing unit without central processing unit dependency. In certain example, the execution of the bit block transfer tasklets may be in parallel by the cores of the graphics processing unit. Each of the bit block transfer tasklets may cause a different block of bits to be moved from one location in memory to another. In an example, the block of bits represent display pixels, and the movement of the block of bits may cause a part of an image to be moved from one place to another on a display.

At block 416, a graphical user interface element is rendered. In an example, the graphical user interface element may be any suitable element including, but not limited to, animation, scrolling text, and an icon.

At block 418, the graphical user interface element is received at a display device of an information handling system. At block 420, the graphical user interface element is displayed, and the method ends at block 422. In an example, the graphical user interface element is displayed during pre-boot operations of the information handling system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a central processing unit to execute a graphics accelerated operation during a pre-boot basic input/output system (BIOS), the central processing unit to initialize multiple protocol scheduler circuitry during an early phase of the pre-boot BIOS; and
a graphics processing unit to communicate with the central processing unit, the graphics processing unit including:
host memory pages;
the multiple protocol scheduler circuitry to initialize the host memory pages, and to create one or more bit block transfer tasklets during the pre-boot BIOS, wherein a number of tasklets created is based on a number of graphics processing cores and a resolution of a display device of the information handling system; and
a first graphics processing core to execute one of the bit block transfer tasklets, and to render a graphical user interface element for display during the pre-boot BIOS.

2. The information handling system of claim 1, wherein the display device to communicate with the graphics processing unit, the display device to receive the graphical user interface element from the graphics processing unit, and to display the graphical user interface element during the pre-boot BIOS.

3. The information handling system of claim 1, wherein the graphics processing unit further includes a plurality of graphics processing cores including the first graphics processing core, each of the graphics processing cores is assigned a different one of the bit block transfer tasklets.

4. The information handling system of claim 3, wherein each of the bit block transfer tasklets is an independent task run on the graphics processing unit without central processing unit dependency.

5. The information handling system of claim 4, wherein the bit block transfer tasklets are executed in parallel by the graphics processing cores.

6. The information handling system of claim 1, wherein in response to execution of the one of the bit block transfer tasklets, the first graphics processing core to move a block of bits from one location in memory to another.

7. The information handling system of claim 6, wherein the block of bits represent display pixels, and the movement of the block of bits causes a part of an image to be moved from one place to another on a display.

8. The information handling system of claim 1, wherein the graphics accelerated operation, tasks for the multiple protocol scheduler circuitry, and each of the one of the bit block transfer tasklets are individually scheduled in a graphics device interface stack.

9. The information handling system of claim 1, wherein the graphical user interface element is selected from a group consisting of icons, widgets, and fonts.

10. A method, comprising:
 executing, by a central processing unit of an information handling system, a graphics accelerated operation during a pre-boot basic input/output system (BIOS);
 during an early phase of the pre-boot BIOS, initializing, by the central processing unit, multiple protocol scheduler circuitry of a graphics processing unit of the information handling system;
 initializing, by the multiple protocol scheduler circuitry, host memory pages of the graphics processing unit;
 creating, by the multiple protocol scheduler circuitry, one or more bit block transfer tasklets during the pre-boot BIOS;
 executing, by a first graphics processing core of the graphics processing unit, one of the bit block transfer tasklets;
 rendering, by the first graphics processing core, a graphical user interface element for display during the pre-boot BIOS; and
 assigning a different one of the bit block transfer tasklets to each of a plurality of graphics processing cores including the first graphics processing core.

11. The method of claim 10, further comprising:
 receiving, by a display device of the information handling system, the graphical user interface element from the graphics processing unit; and
 displaying, by the display device, the graphical user interface element during the pre-boot BIOS.

12. The method of claim 10, further comprising:
 running each of the bit block transfer tasklets independent on the graphics processing unit without central processing unit dependency.

13. The method of claim 12, further comprising:
 executing the bit block transfer tasklets in parallel by the graphics processing cores.

14. The method of claim 10, wherein in response to the executing of the one of the bit block transfer tasklets, the method further comprises:
 moving, by the first graphics processing core, a block of bits from one location in memory to another.

15. The method of claim 14, wherein the block of bits represent display pixels, and the movement of the block of bits cause a part of an image to be moved from one place to another on a display.

16. The method of claim 10, wherein the graphics accelerated operation, tasks for the multiple protocol scheduler circuitry, and each of the one of the bit block transfer tasklets are individually scheduled in a graphics device interface stack.

17. An information handling system, comprising:
 a central processing unit to execute a graphics accelerated operation during a pre-boot basic input/output system (BIOS), the central processing unit to initialize multiple protocol scheduler circuitry during an early phase of the pre-boot BIOS;
 a graphics processing unit to communicate with the central processing unit, the graphics processing unit including:
  host memory pages;
  the multiple protocol scheduler circuitry to initialize the host memory pages, and to create one or more bit block transfer tasklets during the pre-boot BIOS; and
  a plurality of graphics processing cores, each of the graphics processing cores being assigned a different one of the bit block transfer tasklets, each of the graphics processing cores to execute one of the bit block transfer tasklets and to render a different graphical user interface element for display during the pre-boot BIOS; and
 a display device to receive the graphical user interface element from the graphics processing unit, and to display the graphical user interface element during the pre-boot BIOS.

18. The information handling system of claim 17, wherein each of the bit block transfer tasklets is an independent task run on the graphics processing unit without central processing unit dependency.

19. The information handling system of claim 18, wherein the bit block transfer tasklets are executed in parallel by the graphics processing cores.

* * * * *